H. V. FARIES.
Horse Rake.
No. 66,696.
Patented July 16, 1867.
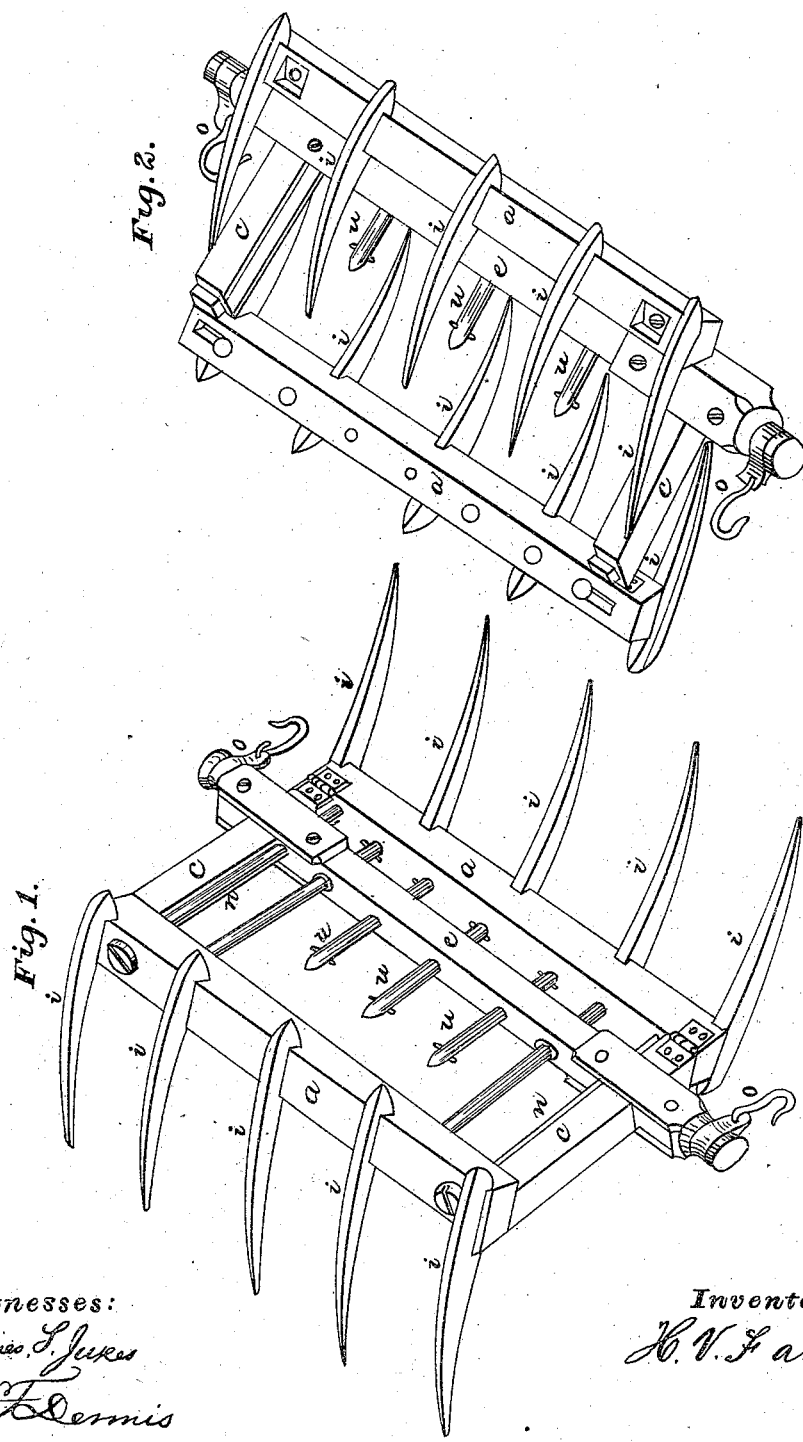

United States Patent Office.

HENRY V. FARRIS, OF RICHMOND, INDIANA.

Letters Patent No. 66,696, dated July 16, 1867.

---

IMPROVEMENT IN HORSE-RAKES.

---

*The Schedule referred to in these Letters Patent and making part of the same.*

---

TO WHOM IT MAY CONCERN:

Be it known that I, HENRY V. FARRIS, of Richmond, Indiana, have invented certain new and useful improvements in Revolving Hay-Rakes; and I hereby declare the following to be a full, clear, and exact description of the same, reference being had to the drawings which accompany this specification, and to the letters of reference marked therein.

Figure 1 is a perspective view of my improved rake, and

Figure 2 is a view of the same when folded up for transportation.

My invention relates to that class of revolving hay-rakes constructed with double heads, in which the rake-teeth serve as handles at each alternate revolution of the rake.

My invention consists in the employment of a self-adjusting draw-bar, working freely upon oblique posts which connect the rake-heads, said bar being fitted with loose pins to prevent hay or grain from passing through when in use.

In fig. 1, $a\ a$ represent two rake-heads of proper size and length, and $i\ i\ i\ i$ are the teeth, which are let into the lower surface of the rake-heads any desirable portion of this thickness and firmly secured, and serve as runners or bearers for the rake, and prevent the heads of the rake from coming in contact with the ground. The rake-heads are connected together by posts $c\ c$, setting obliquely, and by stay-rods $n\ n$. These parts are hinged to the heads $a\ a$, and by removing the stay-rods $n\ n$ the head and the teeth fold together, as shown at fig. 2. The draw-bar $e$ extends entirely across the frame of the rake, the outside ends being fitted to receive the hooks and loops $o\ o$, and is mortised to receive the posts $c\ c$, upon which it slides freely upon each revolution of the rake. The draw-bar $e$ is further provided with pins $u\ u\ u$, which slide freely in their holes in said bar, and serve to prevent the escape of hay or grain in the operation of the rake. When desired a canvas may be used in connection with the draw-bar, by which the finest material my be gathered and saved. The manner of fastening the teeth upon the lower surface of the rake has the advantage of preventing the rake-head from coming in contact with the surface of the ground.

Having thus fully described my said invention, what I claim as new and desire to secure by Letters Patent, is—

The draw-bar $e$, posts $c\ c$, and sliding-pins $u\ u\ u$, when operating and constructed substantially as herein set forth.

H. V. FARRIS.

Witnesses:
   WM. T. DENNIS,
   JAMES S. JUKES.